(12) United States Patent
Koyama et al.

(10) Patent No.: US 7,098,955 B2
(45) Date of Patent: Aug. 29, 2006

(54) OPTICAL APPARATUS OPERABLE IN STATIC AND DYNAMIC IMAGE TAKING MODES

(75) Inventors: Takeshi Koyama, Toshigi (JP); Koji Hoshi, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 926 days.

(21) Appl. No.: 09/978,048

(22) Filed: Oct. 17, 2001

(65) Prior Publication Data

US 2002/0075388 A1   Jun. 20, 2002

(30) Foreign Application Priority Data

| Oct. 26, 2000 | (JP) | ............................. 2000-327094 |
| Oct. 26, 2000 | (JP) | ............................. 2000-327095 |
| Oct. 26, 2000 | (JP) | ............................. 2000-327096 |
| Jan. 9, 2001 | (JP) | ............................. 2001-001938 |

(51) Int. Cl.
   *H04N 5/238*   (2006.01)

(52) U.S. Cl. .................................................. 348/363

(58) Field of Classification Search ................ 348/362, 348/363, 364, 365, 366, 208.5, 220.1, 221.1
   See application file for complete search history.

(56) References Cited

U.S. PATENT DOCUMENTS

| 4,558,368 A | * | 12/1985 | Aoki et al. ............... 348/221.1 |
| 4,827,348 A | * | 5/1989 | Ernest et al. ............ 348/221.1 |
| 5,392,082 A | * | 2/1995 | Ikemori et al. ................ 396/89 |
| 5,444,482 A | * | 8/1995 | Misawa et al. ........... 348/220.1 |
| 5,703,638 A | | 12/1997 | Ohta et al. ................... 348/220 |
| 5,867,213 A | * | 2/1999 | Ouchi ...................... 348/208.5 |
| 5,982,421 A | * | 11/1999 | Inou et al. ............... 348/208.5 |
| 6,028,981 A | | 2/2000 | Hirasawa et al. ........... 386/117 |
| 6,046,768 A | | 4/2000 | Kanede et al. .............. 348/208 |
| 6,047,102 A | | 4/2000 | Ohta ............................ 386/93 |
| 6,630,950 B1 | * | 10/2003 | Ohkawara et al. ....... 348/208.5 |
| 2001/0048474 A1 | * | 12/2001 | Yamazaki et al. .......... 348/207 |

FOREIGN PATENT DOCUMENTS

JP           02151843 A  *  6/1990

* cited by examiner

*Primary Examiner*—Tuan Ho
*Assistant Examiner*—Jason Whipkey
(74) *Attorney, Agent, or Firm*—Fitzpatrick, Cella, Harper & Scinto

(57) ABSTRACT

An optical apparatus includes a photographic optical unit including a movable optical component for varying a focal length, a light amount adjusting unit disposed in an optical path of the photographic optical unit, the light amount adjusting unit varying an aperture to adjust an amount of light and changing an F-number by varying the aperture, an image pickup device for picking up an optical image formed by the photographic optical unit, a mode switching member for selecting a dynamic image taking mode and a static image taking mode, and a controller. The controller sets different values of the F-number of the light amount adjusting unit in accordance with a state selected by the mode switching member, or varies a moving range of the movable optical component in accordance with a state selected by the mode switching member.

2 Claims, 10 Drawing Sheets

FIG.3
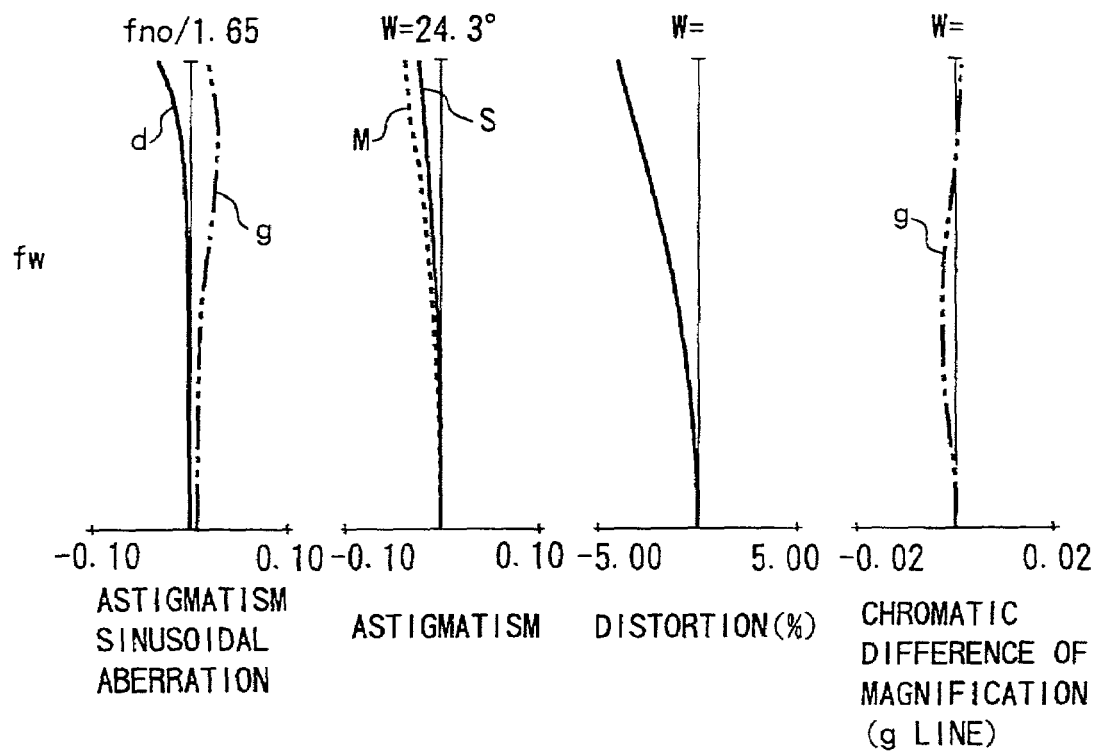
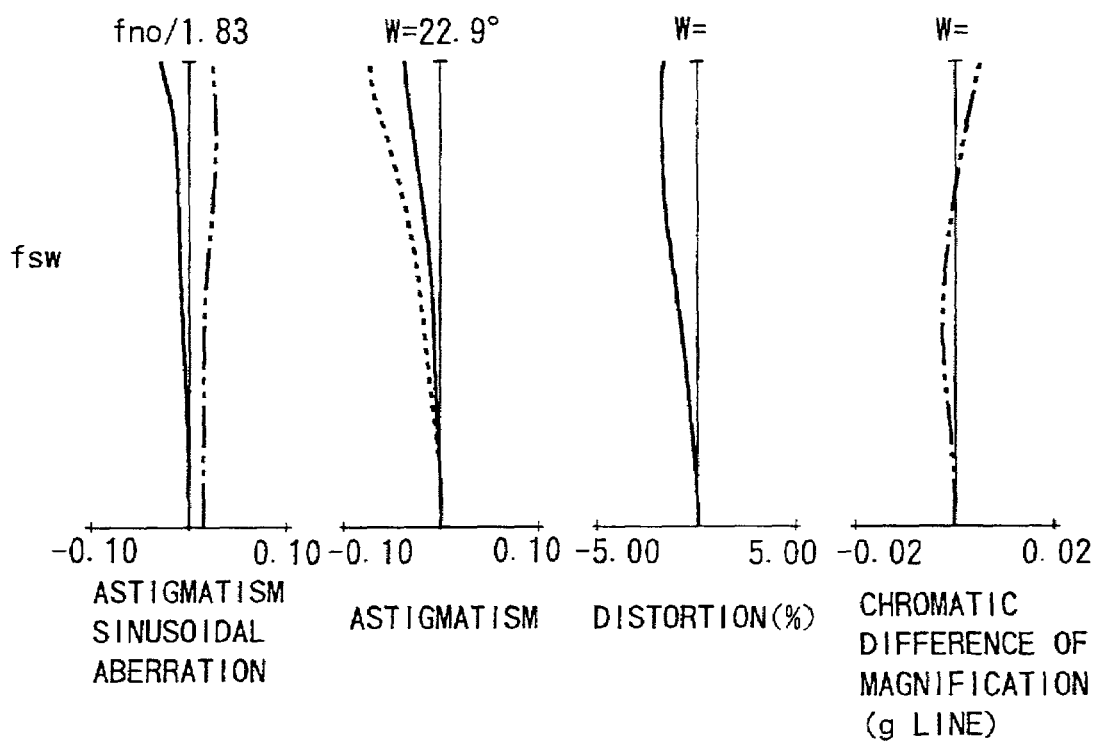

FIG.4
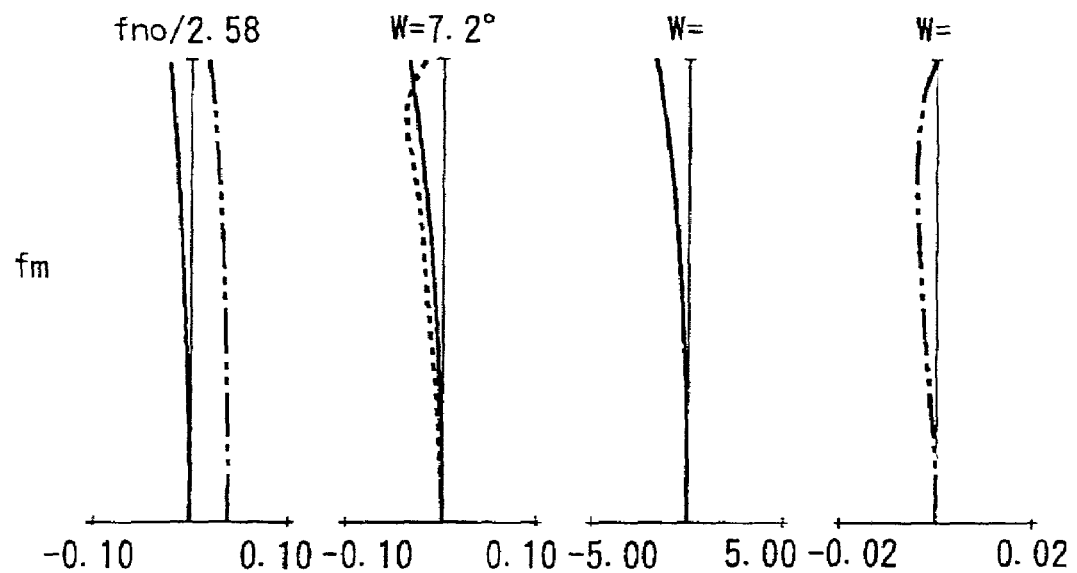
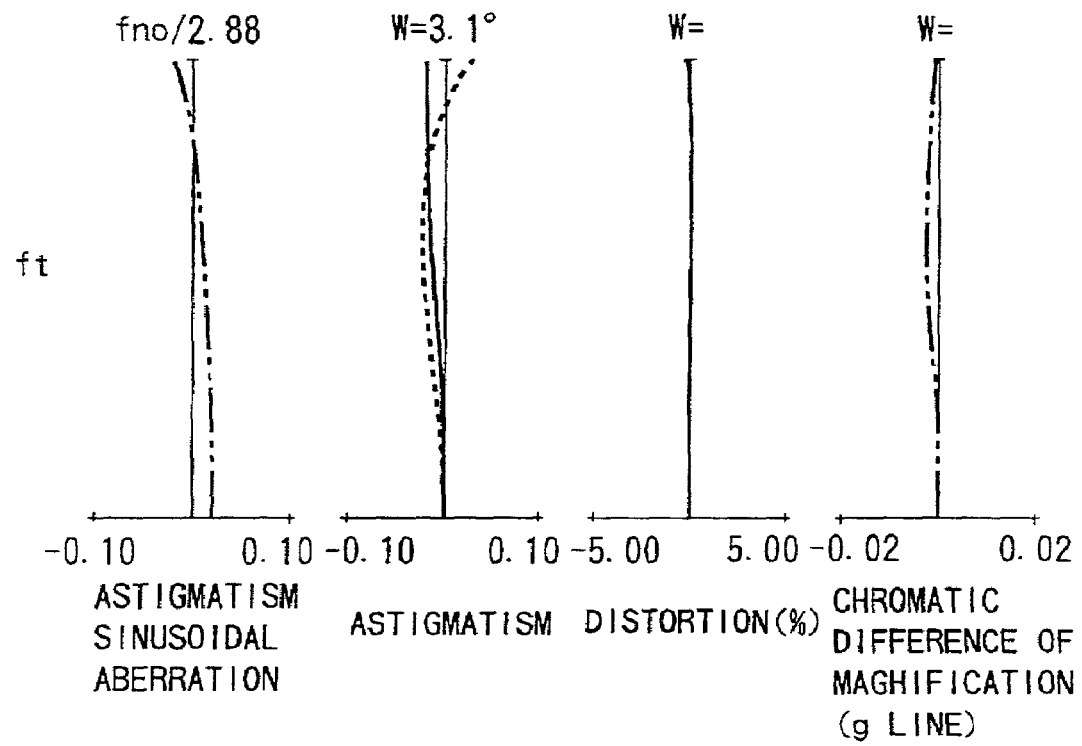

OPTICAL APPARATUS OPERABLE IN STATIC AND DYNAMIC IMAGE TAKING MODES

BACKGROUND OF THE INVENTION

1. Field of the Invention

The present invention relates to an optical apparatus capable of taking both dynamic images and static images for use in an image pickup device or the like.

2. Description of the Related Art

As one of cameras capable of taking both dynamic images and static images, an available camera has a CCD image pickup device for taking dynamic images and allows a silver halide film to be loaded thereinto for taking static images.

The camera is configured such that luminous flux through photographic lenses is divided on an optical path, one divided luminous flux is provided for forming an image on the CCD image pickup device through a reduction optical system and the other divided luminous flux is provided for forming an image on the silver halide film with a larger picture size than the CCD. Such a camera not only can take dynamic images, but also can achieve high picture quality unique to the silver halide film in taking static images.

As another camera capable of taking both dynamic images and static images, a proposed video camera uses photographic lenses and a CCD image pickup device in common for taking dynamic images and static images.

The camera using either the CCD image pickup device or the silver halide film as required to take dynamic images or static images, however, has a problem of an increased size of the camera due to the need of a luminous flux dividing means as mentioned above.

On the other hand, the video camera using the photographic lenses and the CCD image pickup device in common for taking dynamic images and static images cannot provide satisfactorily high-quality static images since it can offer, at the best, quality provided when it uses one of images taken successively in a predetermined time period in taking dynamic images as a static image.

When lenses can be more favorably corrected for aberration to obtain high-quality static images, the lens system and thus the entire camera tend to be increased in size. A simple increase in the number of pixels in the CCD means the use of an excessively high number of pixels over a level required in taking dynamic images, resulting in an overload imposed on dynamic image circuitry.

SUMMARY OF THE INVENTION

To address the problems, it is an object of the present invention to provide an optical apparatus capable of taking dynamic images with a lighter load on dynamic image processing and taking static images with high image quality while the camera has a small size.

To achieve the aforementioned object, an optical apparatus according to the present invention comprises:
a taking optical unit having a fixed focal length;
a light amount adjusting unit disposed in an optical path of the taking optical unit, the light amount adjusting unit varying an aperture to adjust an amount of light and changing an F-number by varying the aperture;
an image pickup device for picking up an optical image formed by the taking optical unit;
a mode switching member for selecting a dynamic image taking mode and a static image taking mode; and
a controller for controlling the variation in the aperture by the light amount adjusting unit;
wherein the controller sets different values of the F-number of the light amount adjusting unit at the fixed focal length of the taking optical unit in accordance with a state selected by the mode switching member.

According to the present invention, an optical apparatus comprises:
a taking optical unit including a movable optical component for varying a focal length;
a light amount adjusting unit disposed in an optical path of the taking optical unit, the light amount adjusting unit varying an aperture to adjust an amount of light and changing an F-number by varying the aperture;
an image pickup device for picking up an optical image formed by the taking optical unit;
a mode switching member for selecting a dynamic image taking mode and a static image taking mode; and
a controller for controlling the variation in the aperture of the light amount adjusting unit;
wherein the controller sets different values of the F-number of the light amount adjusting unit at the same focal length of the taking optical unit in accordance with a state selected by the mode switching member.

According to the present invention, an optical apparatus comprises:
a taking optical unit including a zoom optical component moving along an optical axis to perform a variable power operation;
an image pickup device for picking up an optical image formed by the taking optical unit;
a mode switching member for selecting a dynamic image taking mode and a static image taking mode; and
a controller for controlling a movement of the zoom optical component of the light amount adjusting unit;
wherein the controller varies a variable power range of the zoom optical component in accordance with a state selected by the mode switching member.

According to the present invention, an optical apparatus comprises:
a taking optical unit having an optical axis;
an image pickup device for picking up an optical image formed by the taking optical unit, the image pickup device having a first image size area for performing image pickup and a second image size area for performing image pickup including the first image size area and larger than the first image size area;
a mode switching member for selecting a dynamic image taking mode and a static image taking mode; and
a controller for controlling image pickup of the image pickup device;
wherein the controller switches between the first image size area and the second image size area in accordance with a state selected by the mode switching member.

According to the present invention, an optical apparatus comprises:
a taking optical unit including a movable optical component moving along an optical axis;
an image pickup device for picking up an optical image formed by the taking optical unit;
a mode switching member for selecting a dynamic image taking mode and a static image taking mode; and
a controller for controlling a movement of the movable optical component of the taking optical unit;
wherein the controller varies a moving range of the movable optical component in accordance with a state selected by the mode switching member.

According to the present invention, an optical apparatus comprises:
a taking optical unit including a movable optical component;
an image pickup device for picking up an optical image formed by the taking optical unit;
a mode switching member for selecting a dynamic image taking mode and a static image taking mode; and
a controller for controlling a movable operation of the optical component of the taking optical unit;
wherein the controller varies a movable range of the optical component in accordance with a state selected by the mode switching member.

According to the present invention, an optical apparatus comprises;
a taking optical unit having an optical axis;
a correcting optical component provided on the optical axis of the taking optical unit, the correcting optical component being driven to incline the optical axis for correcting a blur of an image;
an image pickup device for picking up an optical image formed by the taking optical unit, the image pickup device having a first image size area for performing image pickup and a second image size area for performing image pickup including the first image size area and larger than the first image size area;
a mode switching member for selecting a dynamic image taking mode and a static image taking mode; and
a controller for controlling image pickup of the image pickup device;
wherein, when the correcting optical component is driven, the controller switches between the first image size area and the second image size area of the image pickup device in accordance with a state selected by the mode switching member.

According to the present invention, an optical apparatus comprises:
a taking optical unit including a movable optical component for varying a focal length;
a light amount adjusting unit disposed in an optical path of the taking optical unit, the light amount adjusting unit varying an aperture to adjust an amount of light and changing an F-number by varying the aperture;
an image pickup device for picking up an optical image formed by the taking optical unit, the image pickup device having a first image size area for performing image pickup and a second image size area for performing image pickup including the first image size area and larger than the first image size area;
a mode switching member for selecting a dynamic image taking mode and a static image taking mode; and
a light amount controller for controlling the variation in the aperture of the light amount adjusting unit, the light amount controller setting different values of the F-number of the light amount adjusting unit at the same focal length of the taking optical unit in accordance with a state selected by the mode switching member; and
an image pickup controller for controlling image pickup of the image pickup device, the image pickup controller switching between the first images size area and the second image size area of the image pickup device in accordance with a state selected by the mode switching member when the movable optical component is driven.

Other configurations and objects will be obvious in the description of preferred embodiments, later described.

BRIEF DESCRIPTION OF THE DRAWINGS

FIG. 3 shows aberration curves in the numerical embodiment for the photographic lenses, in which the upper diagrams illustrate aberration of the entire lens system in taking dynamic images at focal length fw and the lower diagrams illustrate aberration in taking static images at focal length fsw;

FIG. 4 shows aberration curves in the numerical embodiment for the photographic lens, in which the upper diagrams illustrate aberration of the entire lens system in taking dynamic images at focal length fm and the lower diagrams illustrate aberration in taking static images at focal length ft;

DETAILED DESCRIPTION OF THE PREFERRED EMBODIMENTS

First Embodiment

Figure 1:
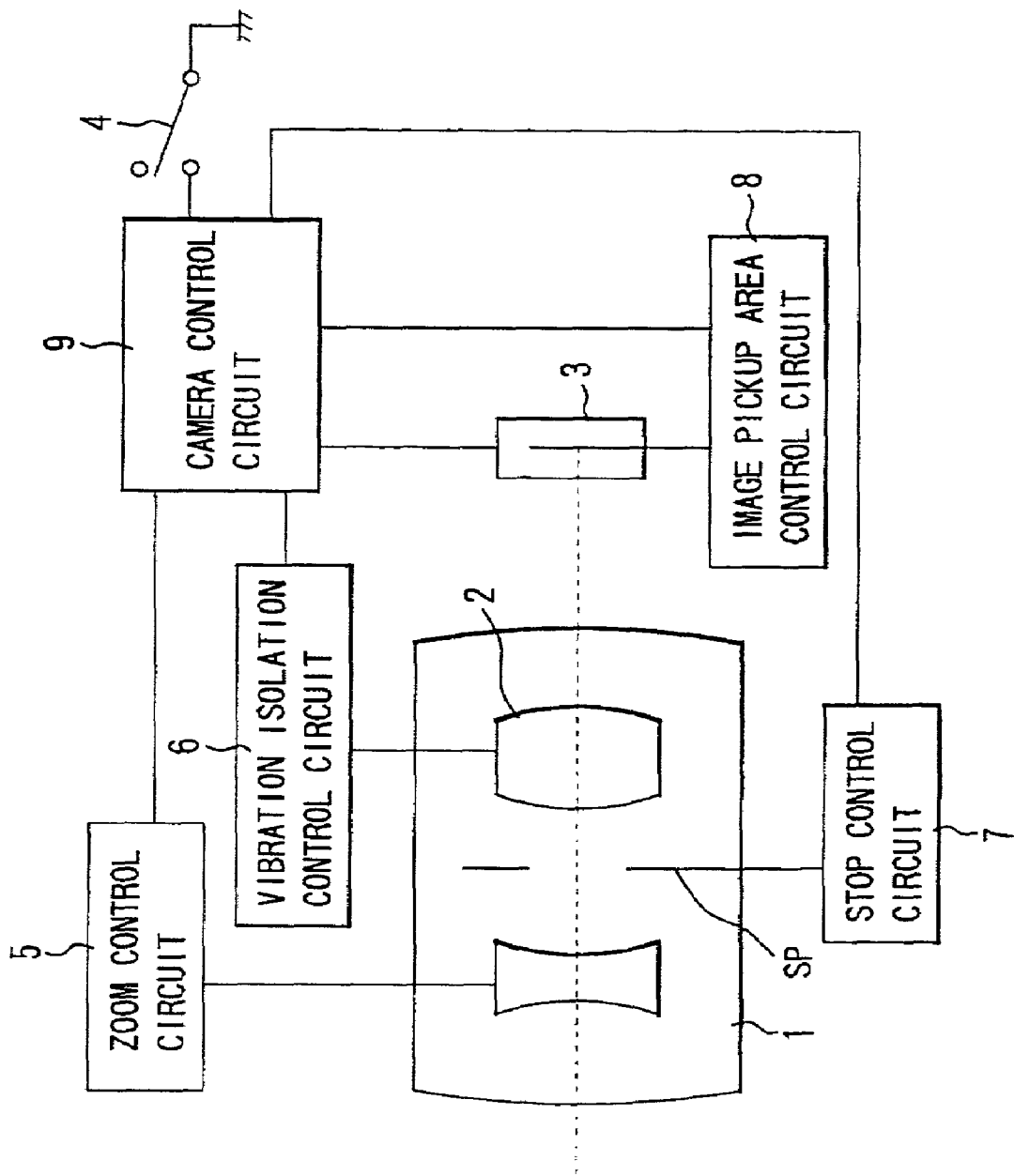
FIG. 1 is a schematic diagram illustrating the configuration of a camera according to a first embodiment of the present invention.
Figure 2:
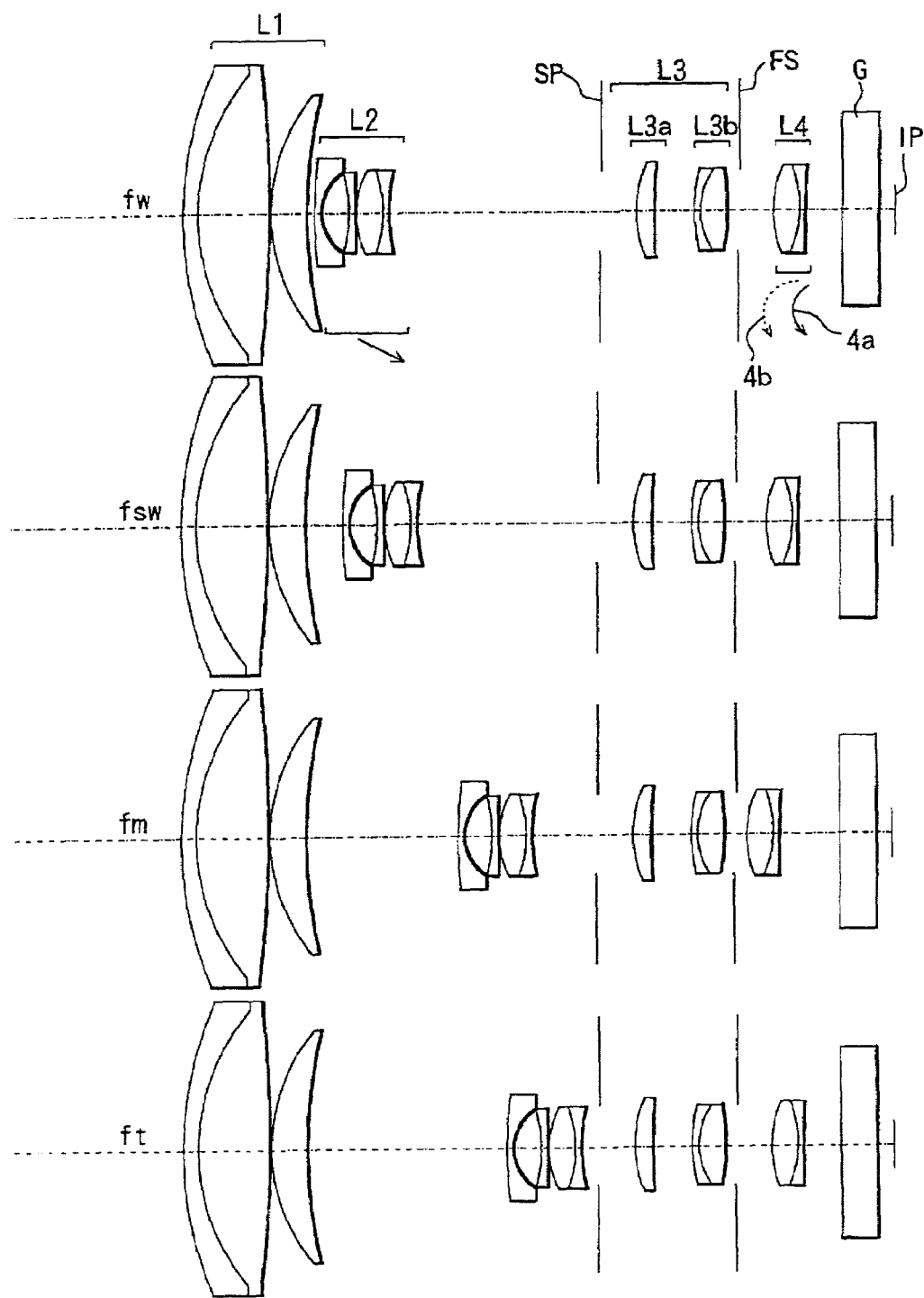
FIG. 2 is a cross-sectional view of optics for illustrating a numerical embodiment for photographic lenses used in the camera.
Figure 5:
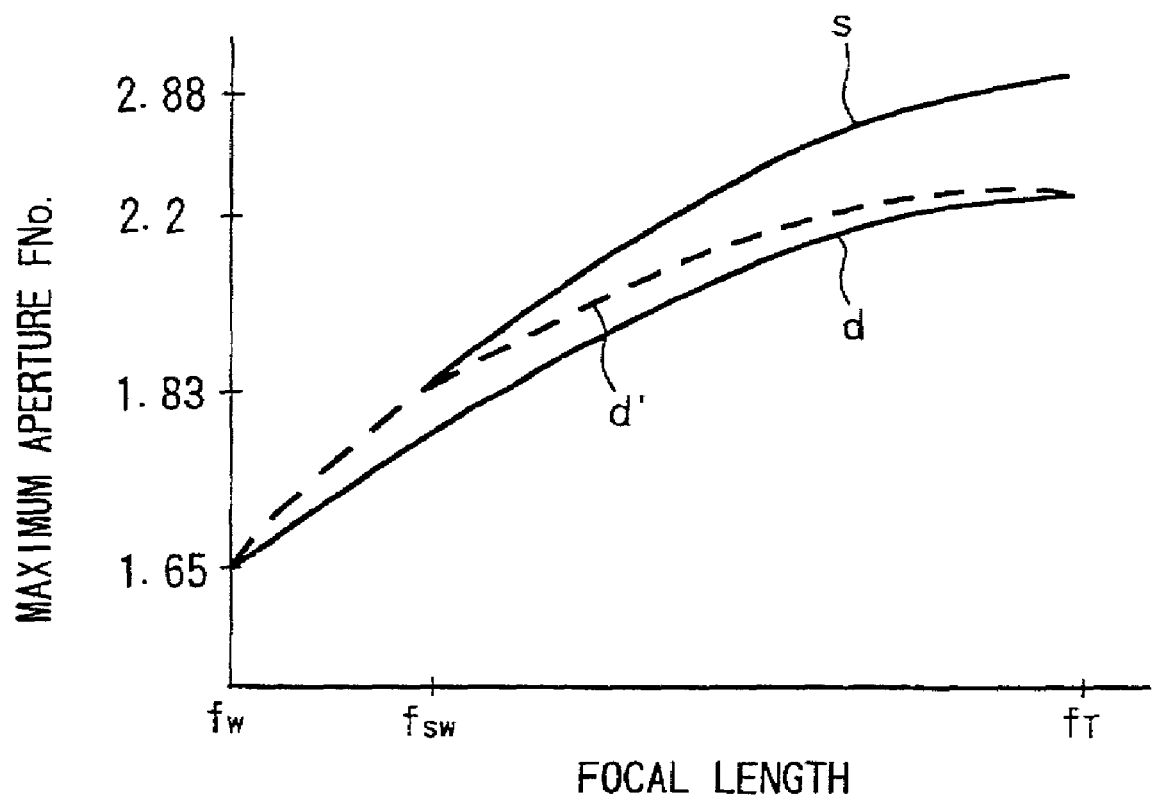
FIG. 5 illustrates the relationship between a focal length and an F-number for a maximum aperture in the camera.
Figure 6:
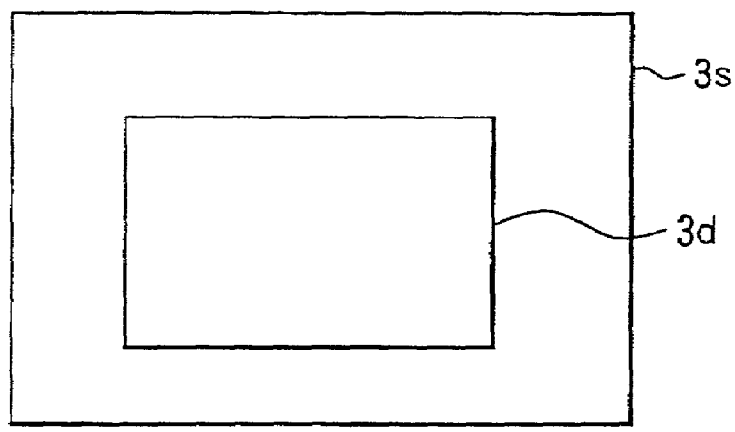
FIG. 6 is an explanation diagram showing image sizes of the photographic lenses in the camera.
Figure 7:
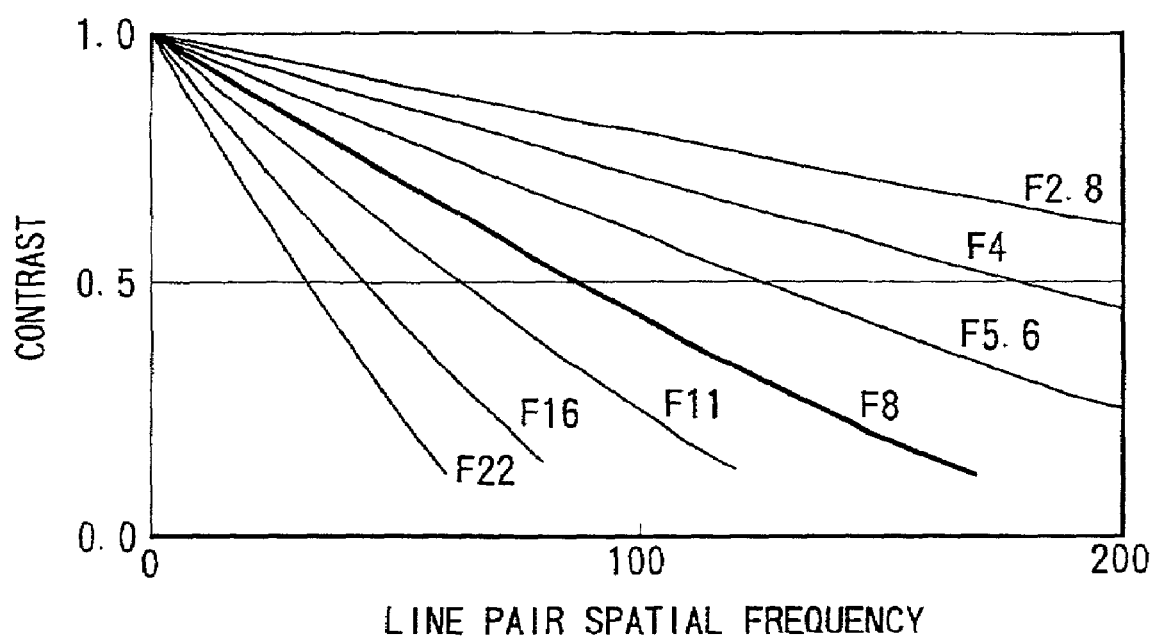
FIG. 7 illustrates a frequency characteristic showing performance of an ideal lens with no aberration represented by F-numbers.
Figure 8:
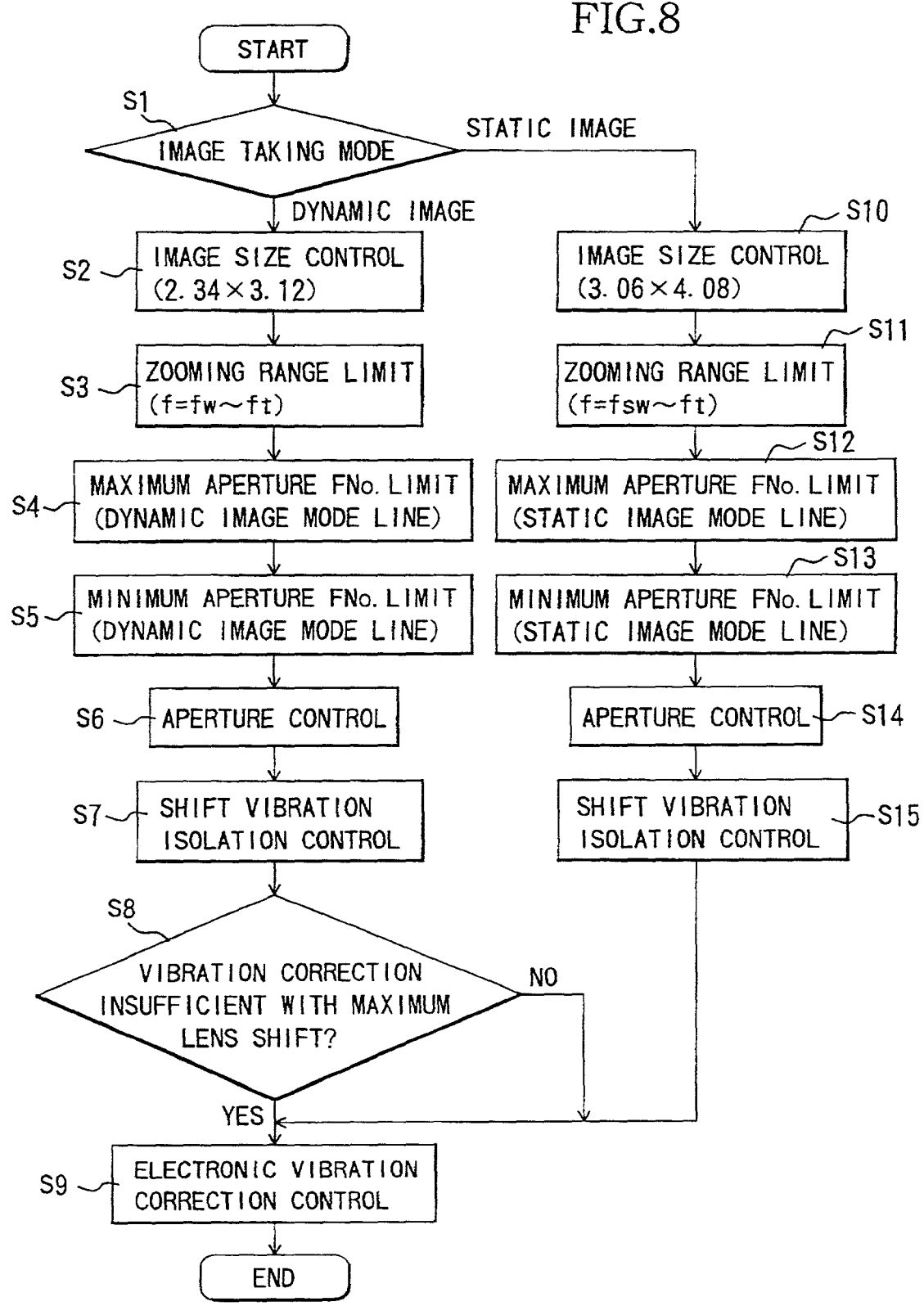
FIG. 8 is a flow chart illustrating the operation sequence in the camera.

FIG. 1 illustrates the configuration of a camera according to a first embodiment of the present invention. FIG. 2 is a cross-sectional view for illustrating a numerical embodiment for photographic lenses used in the camera, and FIGS. 3 and 4 show aberration curves thereof. FIG. 5 illustrates the relationship between a focal length of the photographic lenses and an F-number for a maximum aperture set for each focal length in the camera. FIG. 6 shows image sizes of the photographic lenses in the camera. FIG. 7 illustrates a frequency characteristic showing performance of an ideal lens with no aberration represented by F-numbers. FIG. 8 shows a flow chart illustrating the operation sequence in the camera.

In FIG. 1, reference numeral 1 shows a zoom photographic lens system (photographic optical system). Reference numeral 2 shows a vibration correcting lens forming part of lenses constituting the photographic lens system 1 for performing vibration isolation (so-called camera shake correction) by a displacement in a direction orthogonal to an optical axis.

Reference numeral 3 shows an image pickup device for which a solid-state image sensor is used such as a CCD or a CMOS with a cell pitch (a pitch of arranged pixels) of approximately 3 micron.

Reference numeral 4 shows a mode selection switch for switching between dynamic image taking (a dynamic image mode) and static image taking (a static image mode). In the camera of the embodiment, the photographic lens system 1 and the image pickup device 3 are used in common to take both dynamic images and static images. For example, dynamic image information is recorded in a recording medium such as a video tape or a DVD, not shown, while static image information is recorded in a recording medium such as a sticklike or compact memory device or a DVD. In addition, the dynamic image information and the static image information are recorded on the same recording medium, for example on the same memory device.

Reference numeral 9 shows a camera control circuit responsible for control of the overall operation of this camera. Reference numeral 5 shows a zoom control circuit for zooming control of the photographic lens system 1 in response to a command signal from the camera control circuit 9.

Reference numeral 6 shows a vibration isolation control circuit for shifting control of the vibration correcting lens 2 in response to a command signal from the camera control circuit 9. Reference numeral 7 shows a stop control circuit for drive control of a stop SP in response to a command signal from the camera control circuit 9. In the embodiment, a predetermined F-number can be obtained by controlling the stop SP.

Reference numeral 8 shows an image pickup area control circuit for controlling switch of image pickup areas (image sizes) on the image pickup device 3 in response to a command signal from the camera control circuit 9.

A shutter mechanism, the illustration of which is omitted, is provided on an optical axis ahead of the image pickup device 3 or on an optical axis within the photographic lens system 1. The shutter mechanism maintains an opened state in the dynamic image taking mode to exert no influence on an amount of light for the photographic lens system 1, while it is driven in the static image taking mode to move from the opened state to a totally closed state at a predetermined timing under control of the camera control circuit 9 such that a predetermined amount of light is obtained as a stored amount of light in light-receiving pixels of the image pickup device 3. The image pickup device 3 is controlled by the image pickup area control circuit 8 to vary a time period for storing light such that the stored amount of light in the light-receiving pixels is equal to the predetermined amount of light. It should be noted that the function of varying the time period for storing light in the light-receiving pixels of the image pickup device 3 is referred to as "an electronic shutter."

Next, the operation of the camera (mainly of the camera control circuit 9) will hereinafter be described in accordance with the flow chart of FIG. 8. First, power is turned on by throwing a main switch, not shown, to start the flow. Then, at step (abbreviated as "S" in FIG. 8) 1, the state of the mode selection switch 4 is detected to determine whether the camera is in the dynamic image mode or the static image mode.

When the camera is in the dynamic image mode, the flow proceeds to step 2 at which an image size is set through the image pickup area control circuit 8 such that an image is obtained from a range of a dynamic image pickup area 3*d* (for example, ϕ3.9 or 2.34 mm×3.12 mm) of the image pickup device 3 shown in FIG. 6.

Subsequently, at step 3, the focal length of the photographic lens system 1 in the dynamic image mode is set to have a variable range of fw to ft, i.e. a full range from the wide end to the tele end.

Next, at step 4, an F-number for a maximum aperture with respect to a focal length in the dynamic image mode is set as controlled on an aperture curve d for dynamic images shown in FIG. 5. In the embodiment, the F-number for the maximum aperture in the dynamic image mode varies in a range of 1.65 to 2.2 in accordance with a focal length.

At step 5, an F-number for a minimum aperture in the dynamic image mode is set to a minimum aperture value for dynamic images (for example, F11).

Then, at step 6, the stop SP in the dynamic image mode is controlled between the F-number for the maximum aperture set at step 4 and the F-number for the minimum aperture set at step 5.

At step 7, optical vibration isolation control is started by shifting the vibration correcting lens 2 in a direction orthogonal to an optical axis based on information from a vibration detecting means (for example, formed of an acceleration or velocity sensor and a circuit for integrating the output from the sensor) provided for the photographic lens or the camera body.

Next, at step 8, it is determined whether camera shake can be corrected only by shifting the vibration correcting lens 2 as described above (whether the correction of the vibration is insufficient) in the dynamic image mode, and if not, so-called electronic vibration isolation control is performed by shifting the aforementioned dynamic image pickup area to another one and taking the other area from within a wider area (for example, 3.06 mm×4.08 mm at the maximum) on the image pickup device 3.

On the other hand, when the camera is determined as being in the static image taking mode at step 1, the flow proceeds to step 10 at which a larger image size (with a higher number of pixels) than that in taking dynamic images is set such that an image is obtained from a static image pickup area (for example, ϕ5.1 or 3.06 mm×4.08 mm) on the image pickup device 3.

Next, at step 11, the focal length in the static image mode is limited to a variable range of fsw to ft, i.e. of the wide end fsw in static images at a position shifted somewhat to the tele end from the wide end in taking dynamic images, to the tele end ft. With this limit, in taking static images, zooming cannot be made in a range of fw to fsw closer to the wide end in which zooming can be made in taking dynamic images.

It is thus possible to eliminate an influence upon static images, exerted by distortion of the photographic lens system 1 or residual aberration such as comatic aberration or chromatic difference of magnification, which is significant in a range closer to the wide end. Therefore, the quality of static images can be improved without increasing the size of the photographic lens system 1 and with necessary variable powers (fsw to ft) ensured to a certain degree.

At step 12, an F-number for a maximum aperture with respect to a focal length in the static image mode is set as controlled on an aperture curve s for static images shown in FIG. 5. In the embodiment, the F-number for the maximum aperture in the static image mode varies in a range of 1.83 to 2.88 in accordance with a focal length.

In other words, in the embodiment, the F-number for the maximum aperture is set to be larger in the static image taking than the dynamic image taking for the same focal length in the focal length range of fsw to ft, that is, the open F-number is set to pass less light in the static image taking than the dynamic image taking for the same focal length. In the embodiment, the open F-number is set to pass less light in the static image taking than the dynamic image taking particularly in a range closer to the tele end.

Then, at step 13, an F-number for a minimum aperture in the static image mode is set to a minimum aperture value for static images (for example, F8) which allows more light than in the dynamic image mode. In other words, setting is made such that the aperture cannot be stopped down in the static image mode to an F-number (for example, F11) which can be set in the dynamic image mode.

In a range of F8 to F11, degradation in performance due to physical optics factors in a diffraction phenomenon is greater than improvement in optical resolution due to geometrical optics aberration reduction factors near on an axis resulting from a larger F-number. For this reason, the F-number for the minimum aperture in taking static images in this range is set to be smaller than the F-number for the minimum aperture in taking dynamic images.

Thus, in the embodiment, at step 14, the stop SP in the static image mode is controlled between the F-number for the maximum aperture set at step 12 and the F-number for the minimum aperture set at step 13.

At the aforementioned step 14, the aperture control is performed between the maximum aperture and the minimum aperture in the static image mode, and at this time, to compensate for the light amount adjustment with the aperture, low object brightness is preferably compensated for an insufficient amount of light by a low shutter speed with the shutter mechanism (not shown) or the electronic shutter of the image pickup device 3 or an electronic flash (not shown).

With the minimum aperture F-number in taking static images set to be smaller (to pass more light) than the minimum aperture F-number in taking dynamic images, it is preferable to use a high electronic shutter speed with the image pickup device 3 or a high shutter speed with the shutter mechanism (not shown) in the photographic lens system 1 to avoid an excessive amount of light for high object brightness.

At step 15, optical vibration isolation control, similar to the aforementioned one at step 7, is started.

As described above, according to the embodiment, since the open F-number is set to pass less light in the static image taking than the dynamic image taking for the same focal length of the photographic lens system 1, bright dynamic images can be taken while it is possible to suppress degradation in optical performance due to spherical aberration, chromatic aberration, assembly decentering errors or the like of the photographic optical system 1 in taking static images. Therefore, aberration and the like can be favorably corrected in the compact photographic lens system 1 to realize a camera capable of taking bright dynamic images and high-quality static images with a lighter load on dynamic image processing.

While the embodiment has been described for the maximum aperture F-number controlled to provide completely different characteristics as shown in the curve d and the curve s in FIG. 5 (no intersection of the two lines) between the dynamic image taking and the static image taking, it is essential that the maximum aperture F-number in taking dynamic images for focal length ft is set to be smaller than the maximum aperture F-number in taking static images to obtain favorable quality of static images. Thus, it may be possible in taking dynamic images to use a curve d' on which the maximum aperture F-number in taking dynamic images for focal length fsw matches the maximum aperture F-number in taking static images.

In the embodiment, the image size on the image pickup device 3 in taking static images is larger than the image size in taking dynamic images to use a higher number of pixels in the static image taking than the dynamic image taking, thereby achieving high image quality of static images. In this case, the aforementioned control of the open F-number to pass less light in taking static images allows favorable correction of peripheral aberration in the static images without increasing the size of the photographic lens system 1, which enables high-quality static images.

In addition, in the embodiment, the minimum aperture F-number (F=8) in taking static images is set to be smaller than the minimum aperture F-number (F=11) in taking dynamic images in the aperture range from approximately F=8 to 11 of the F-number variable range of the stop SP, that is, in the range in which degradation in performance due to physical optics factors in a diffraction phenomenon is greater than improvement in optical resolution due to geometrical optics aberration reduction factors near on an axis resulting from a higher F-number. Such setting can provide higher image quality in the static image taking than the dynamic image taking.

The above will specifically be described with reference to FIG. 7. FIG. 7 shows a frequency characteristic for contrast represented by F-numbers of an ideal lens with no aberration, for illustrating how the optical performance of the photographic lens system 1 is changed with the F-numbers.

In FIG. 7, when the F-number is increased to F8, the contrast is reduced to approximately 50% at 80 line pairs corresponding to half in the Nyquist line pair spatial frequency in a three-micron pitch CCD. Since the contrast is further reduced when the actual photographic lens system 1 with inherent aberration is used, the F-number is controlled not to be larger than F8 in taking static images in the embodiment to obtain high-quality static images.

Here, the following condition is desirably satisfied:

$$0.2 < F\text{smin} \times \lambda / P < 4.4 \tag{1}$$

where P represents the pitch of the repeatedly arranged light receiving pixels of the image pickup device 3, λ represents a reference wavelength for image taking of light rays sensed by the image pickup device 3, and Fsmin represents the F-number for the minimum aperture in the stop (light amount adjusting unit) in the static image taking mode.

Substituting Fsmin=8, λ=0.588, and P=3 into the central term of the conditional expression (1) yields 1.57 (Fsmin× λ/P=1.57) which satisfies the relationship of the conditional expression (1), where λ=0.588 represents a wavelength of 588 nm of d rays serving as a reference wavelength for taking images, and P=3 represents a pitch of 3 μm of the arranged pixels in the CCD serving as the image pickup device 3.

In the aforementioned expression (1), a lower limit value is preferably set to 0.4, and more preferably to 0.8, for obtaining a wider range in which a light amount can be adjusted. In addition, an upper limit value set to 3.3 or 2.2 is suitable for suppressing degraded performance due to a diffraction phenomenon.

In the embodiment, the image size in taking dynamic images when vibration isolation is performed is set to be smaller than the image size in taking static images when vibration isolation is similarly performed, and thus dynamic images are taken in an inner image pickup area excluding the peripheral area where an amount of light tends to be unbalanced in association with the vibration isolation, so that the unbalanced light amount in the periphery associated with the vibration isolation can become less prominent in taking dynamic images. Thus, sufficient vibration isolation can be performed in taking dynamic images without increasing the size of the photographic lens system 1.

Since the taking of a static image which captures moments originally has a wider allowable range of an unbalanced light amount in the periphery, unbalance of a light amount in the periphery produced in the vibration isolation is not prominent even with the larger image size.

In addition, since the maximum aperture F-number in taking static images is set to be larger than the maximum aperture F-number in taking dynamic images for the same focal length of the photographic lens system 1, it is possible to improve an unbalanced light amount in the periphery during the vibration isolation when images are taken at the maximum aperture in taking static images.

While the aforementioned embodiment has been described for the maximum aperture F-number in taking static images set to be larger than the maximum aperture F-number in taking dynamic images for the same focal length in the partial range from fsw to ft of the full variable range from fw to ft of the focal length, the maximum aperture F-number in taking static images may be set to be larger than the maximum aperture F-number in taking dynamic images for the same focal length in the full variable range from fw to ft of the focal length.

Also, while the aforementioned embodiment has been described for the use of the photographic lens system of a variable-focal-length lens type, the present invention is applicable to the use of a photographic lens system of a single focal length lens (a fixed-focal-length lens). (numerical embodiment)

Next, Table 1 shows a numerical embodiment for the photographic optical system used in the optical apparatus of the present invention.

As shown in FIG. 2, the photographic optical system is a zoom lens of a four-group rear focusing type, comprising fixed first-group lenses L1, second-group lenses L2 serving as a varietor, a stop SP, third-group lenses (vibration correcting lens) L3, a flare stopper FS, fourth-group lenses L4 serving as a focus lens and compensator, and a glass block G such as a faceplate or a filter, all of which are arranged in this order from a position closer to an object.

A solid line 4a shown under the fourth-group lenses L4 in FIG. 2 indicates the movement of the fourth-group lenses L4 for correcting image plane variations associated with varied power from the wide end to the tele end when an object at infinity is brought into focus. A dotted line 4b indicates the movement of the fourth-group lenses L4 for correcting image plane variations associated with varied power from the wide end to the tele end when an object at a short distance is brought into focus.

FIG. 2 illustrates cross-sections of optics, from the top, at focal length fw (the wide end in taking dynamic images) of the photographic optical system, fsw (the wide end in taking static images), fm (middle), and ft (the tele end). FIGS. 3 and 4 are aberration curves for each of the above focal lengths.

In Table 1, ri represents a radius of curvature of i-th one of surfaces arranged in order from the object, di represents a distance (a value of equivalent air) between i-th surface and (I+1)th surface in order from the object, Ni and vi (written as "v" in Table 1) represent a refractive index and an Abbe number of glass of i-th optical member in order from the object, respectively.

An aspheric shape in the 14th row in Table 1 is represented by the following equation:

$$X = \frac{H^2/R}{1+\sqrt{1-(1+K)(H/R)^2}} + AH^2 + BH^4 + CH^6 + DH^8 + EH^{10}$$

where an X axis is taken in an optical axis direction, an H axis is taken in a direction orthogonal to the optical axis, light travels in a positive direction, R represents a paraxial radius of curvature, and K, A, B, C, D, and E each represent aspheric coefficients. In addition, the notation of "e-z" means "$10^{-z}$."

| f = 4.32~42.02 | FNo = 1: 1.65~ | 2ω = 48.6°~ | |
|---|---|---|---|
| r 1 = 45.054 | d 1 = 1.40 | n 1 = 1.84666 | v 1 = 23.9 |
| r 2 = 25.429 | d 2 = 6.96 | n 2 = 1.48749 | v 2 = 70.2 |
| r 3 = −171.864 | d 3 = 0.20 | | |
| r 4 = 21.420 | d 4 = 3.55 | n 3 = 1.77250 | v 3 = 49.6 |
| r 5 = 56.119 | d 5 = variable | | |
| r 6 = 62.351 | d 6 = 0.60 | n 4 = 1.84666 | v 4 = 23.9 |
| r 7 = 5.298 | d 7 = 2.81 | | |
| r 8 = −14.229 | d 8 = 0.50 | n 5 = 1.78590 | v 5 = 44.2 |
| r 9 = 137.803 | d 9 = 0.20 | | |
| r 10 = 11.940 | d 10 = 2.74 | n 6 = 1.84666 | v 6 = 23.9 |
| r 11 = −11.940 | d 11 = 0.50 | n 7 = 1.60311 | v 7 = 60.6 |
| r 12 = 19.515 | d 12 = variable | | |
| r 13 = ∞ (stop) | d 13 = 3.30 | | |
| r 14 = 12.798(aspheric surface) | d 14 = 1.89 | n 8 = 1.80610 | v 8 = 40.7 |
| r 15 = 99.912 | d 15 = 3.83 | | |
| r 16 = 22.767 | d 16 = 0.50 | n 9 = 1.84666 | v 9 = 23.9 |
| r 17 = 7.926 | d 17 = 2.70 | n 10 = 1.48749 | v 10 = 70.2 |
| r 18 = −33.906 | d 18 = 1.01 | | |
| r 19 = ∞ | d 19 variable | | |
| r 20 = 13.355 | d 20 = 2.66 | n 11 = 1.78590 | v 11 = 44.2 |
| r 21 = −13.355 | d 21 = 0.50 | n 12 = 1.84666 | v 12 = 23.9 |
| r 22 = 175.611 | d 22 = variable | | |
| r 23 = ∞ | d 23 = 3.60 | n 13 = 1.51633 | v 13 = 64.1 |
| r 24 = ∞ | | | |

-continued

|  | fw | fsw | fm | ft |
|---|---|---|---|---|
|  |  | focal length |  |  |
| variable distance | 4.32 | 5.33 | 17.78 | 42.02 |
| d 5 | 0.84 | 3.67 | 15.02 | 19.75 |
| d 12 | 20.60 | 17.76 | 6.42 | 1.69 |
| d 19 | 3.44 | 2.91 | 1.12 | 4.12 |
| d 22 | 3.49 | 4.02 | 5.81 | 2.81 |

| aspheric coefficient 14$^{th}$ surface | | | | | |
|---|---|---|---|---|---|
| K | A | B | C | D | E |
| −7.0131e−01 | 0.0000e+00 | −1.8642e−05 | −2.0047e−07 | 1.5637e−08 | −1.9706e−10 |

In the numerical embodiment, the rear focusing type as mentioned above is employed to prevent degraded performance due to decentering errors in the first-group and to effectively prevent an increase in effective aperture of the first-group lenses as compared with focusing by moving a first-group forward in a so-called four-group zoom lens.

The stop SP is disposed immediately before the third-group or in the third-group to reduce variations in aberration from the moving lens group, and the distance between the lens groups before the stop SP is reduced to readily achieve a reduction in diameter of the first-group lenses.

Second Embodiment

Figure 9:
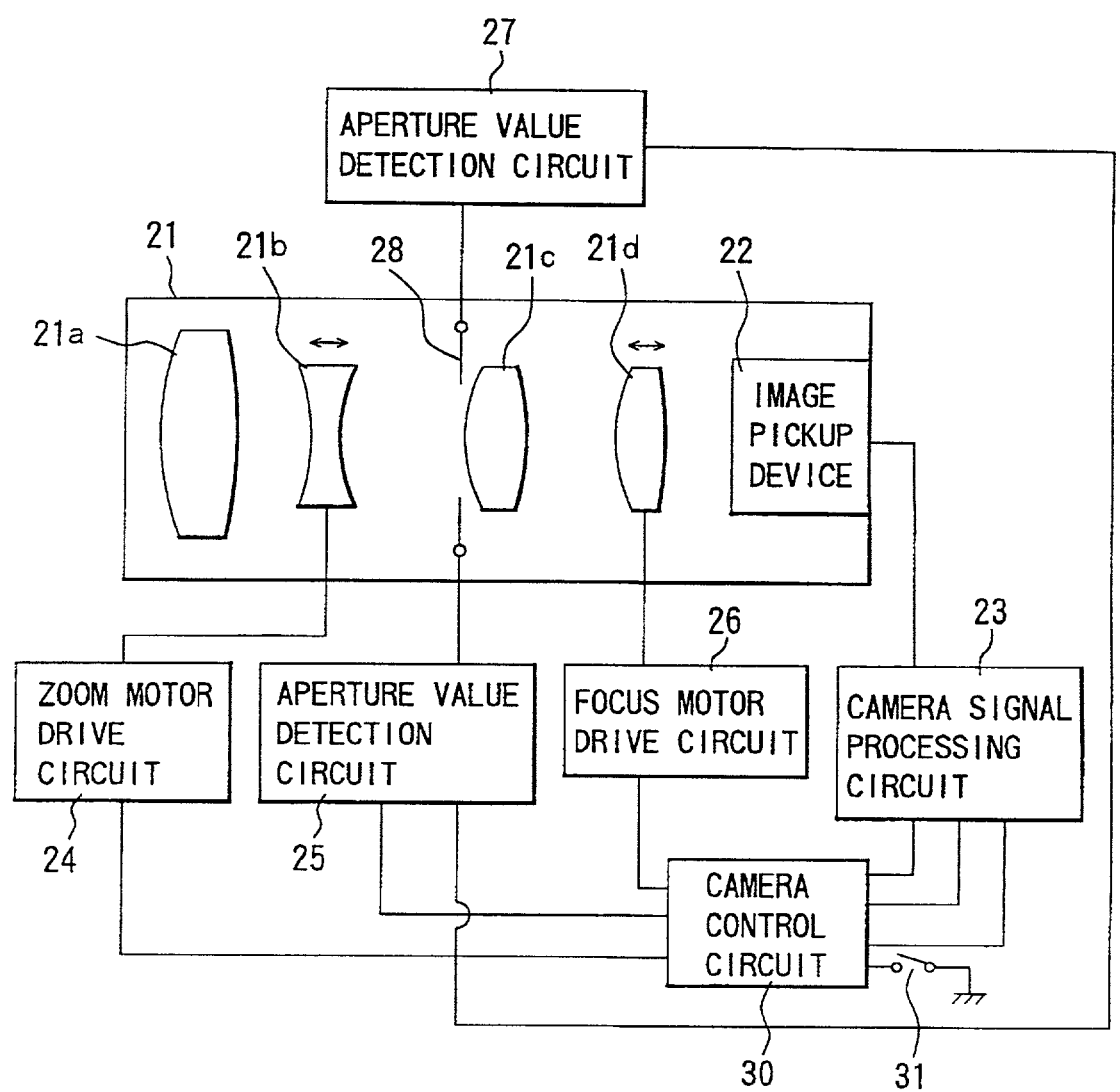
FIG. 9 is a schematic diagram illustrating the configuration of a camera according to a second embodiment of the present invention.

FIG. 9 illustrates the configuration of a camera according to a second embodiment of the present invention. In FIG. 9, reference numeral 21 shows a zoom photographic lens system (photographic optical system) which includes a fixed first-group lens 21a, a second-group lens 21b to be driven for varying power in an optical axis direction, a fixed third-group lens 21c, and a fourth-group lens 21d to be driven for focusing. The photographic lens system 21 has a four-group configuration having convex, concave, convex, and convex power in this order from a subject.

Reference numeral 28 shows a stop controlled by an aperture value control actuation circuit 25 such that the detection result of an aperture value by an aperture value detection circuit 27 is a target value. Reference numeral 22 shows an image pickup device such as a CCD, and video signals from the image pickup device 22 are input to a camera signal processing circuit 23 for performing various types of signal processing.

Reference numeral 24 shows a zoom motor drive circuit for controlling the driving of a zoom motor, not shown, for moving the second-group lens 21b according to the zooming operation of a photographer. Reference numeral 26 shows a focus motor drive circuit for controlling the driving of a focus motor, not shown, for moving the fourth-group lens 21d according to autofocus signals produced with signals from the image pickup device 22.

Reference numeral 30 shows a camera control circuit responsible for controlling the operation of each of the aforementioned circuits. Reference numeral 31 shows a mode selection switch for selecting a dynamic image taking mode or a static image taking mode through the operation of a photographer.

Figure 10:
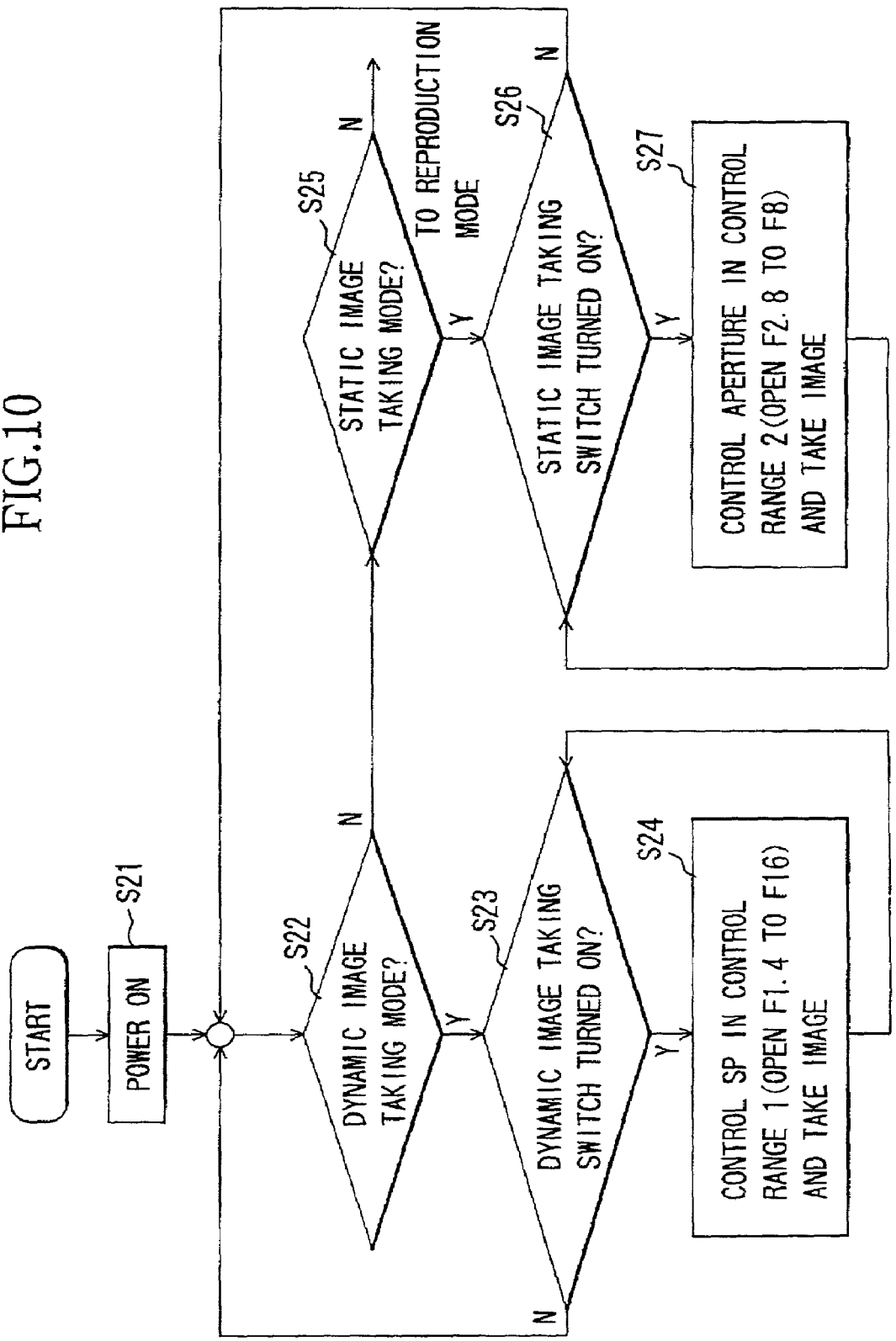
FIG. 10 is a flow chart illustrating the operation of the camera of the second embodiment.

Next, the operation for taking images in the camera configured as described above will be described with reference to a flow chart shown in FIG. 10.

After power is turned on first in the camera (step (abbreviated as "S" in FIG. 10) 21), the camera control circuit 30 detects the state of the mode selection switch 31 to determine whether the dynamic image taking mode is set (step 22). The flow proceeds to step 23 when the dynamic image taking mode is set, or to step 5 when the dynamic image taking mode is not set.

At step 23, it is determined whether a dynamic image taking switch (not shown) for starting dynamic image taking is turned on. If not, the flow returns to step 22. If the switch is turned on, the flow proceeds to step 24 to start dynamic image taking.

An F-number in taking dynamic images is controlled in accordance with the focal length of the photographic lens system 21 in a range from an open value of F1.4 to a minimum aperture value of F16.

On the other hand, at step 25, the state of the mode selection switch 31 is detected to determine whether the static image taking mode is set. The flow proceeds to a reproduction mode when the static image taking mode is not set, or to step 26 when the static image taking mode is set.

At step 26, it is determined whether a static image taking switch (not shown) for starting static image taking is turned on. If not, the flow returns to step 22. If the switch is turned on, the flow proceeds to step 27 to start static image taking.

An F-number in taking static images is controlled in accordance with the focal length of the photographic lens system 21 in a range from an open value of F2.8 to a minimum aperture value of F8.

The open F-number in taking static images is controlled to be larger than the open F-number in taking dynamic images for the same focal length. The minimum aperture F-number in taking static images is controlled to be smaller than the minimum aperture F-number in taking dynamic images for the same focal length.

The open F-number in taking static images is set to be larger (for less light) than the open F-number in taking dynamic images in this manner because the dynamic image taking only requires a normal level of image quality and places more importance on brightness of images than image forming performance to obtain high image quality, while the static image taking places importance on suppressing degradation in image forming performance due to spherical aberration, chromatic aberration or the like in the photographic lens system 21 to obtain higher image quality.

The minimum aperture F-number in taking static images is set to be smaller (for more light) than the minimum aperture F-number in taking dynamic images because the static image taking more strongly requires prevention of degradation in image forming performance due to small aperture diffraction than the dynamic image taking.

The number of pixels for image pickup in the image pickup device 22 may be higher (a larger image size) in the static image taking than the dynamic image taking to allow static images to be taken with a higher resolution than the dynamic image taking.

Figure 11:
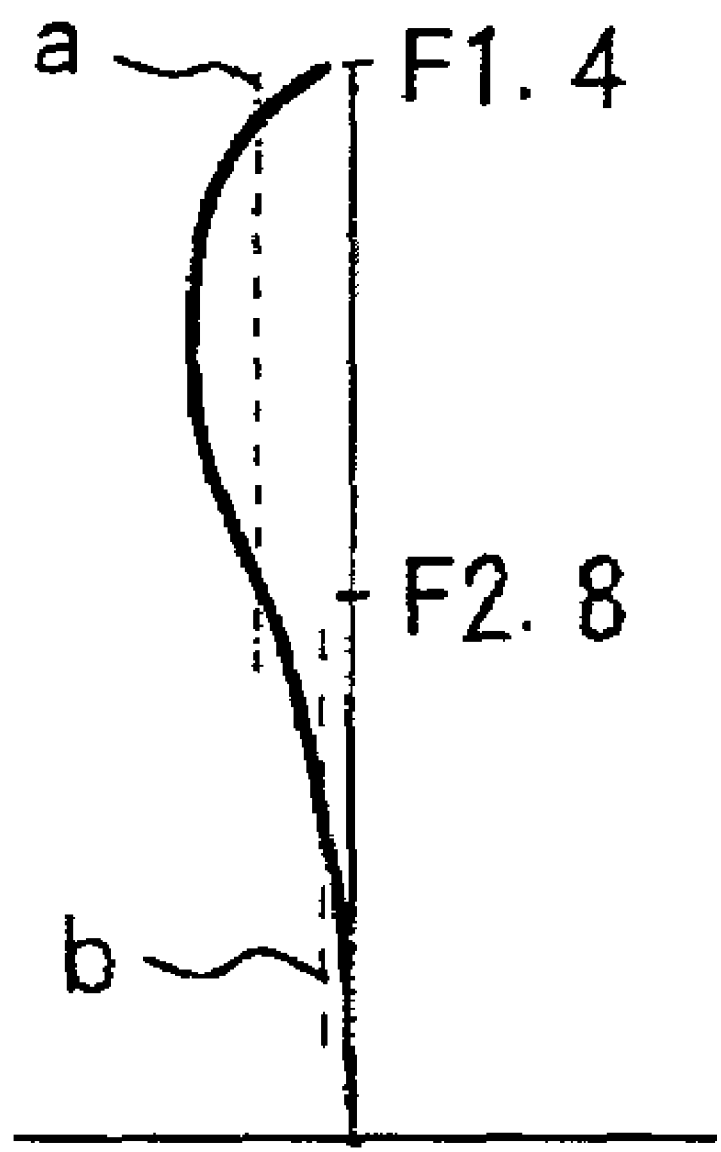
FIG. 11 illustrates spherical aberration of photographic lenses in the camera of the second embodiment.

FIG. 11 is an aberration curve for explaining the spherical aberration produced in the photographic lens system 21 in the embodiment.

While a paraxial image plane position and an optimal image plane position are spaced at F1.4, an optimal image plane position b is closer to the paraxial image plane position at F2.8. Thus, the open F-number in taking static images set to F2.8 can reduce an influence of spherical aberration upon taken images to obtain high-quality static images.

It should be noted that the values of the open F-number and the minimum aperture F-number in taking static images and dynamic images used in the embodiment are only illustrative, and other F-numbers may be used.

As described above, in the aforementioned embodiment, since the maximum aperture F-number in taking static images is larger than that in taking dynamic images for the same focal length, bright dynamic images can be taken, and at the same time, it is possible to suppress degraded optical performance due to spherical aberration, chromatic aberration, assembly decentering errors or the like of the photographic optical system in taking static images. Thus, a compact photographic optical system can be used to realize a camera capable of taking bright dynamic images and high-quality static images with a lighter load on dynamic image processing.

When the image size in taking static images is set to be larger than the image size in taking dynamic images, the number of pixels in the static image taking can be higher than the dynamic image taking to improve the quality of static images. In this case, the application of the aforementioned invention enables favorable correction of peripheral aberration in static images without increasing the size of the photographic optical system, thereby making it possible to realize a compact camera capable of taking high-quality static images.

In the aforementioned embodiment, the minimum aperture F-number in taking static images and the minimum aperture F-number in taking dynamic images are set such that the former is set to be smaller than the latter in the partial range of the full F-number variable range in which degradation in performance due to physical optics factors in a diffraction phenomenon is greater than improvement in optical resolution due to geometrical optics aberration reduction factors near on an axis resulting from a higher F-number. Thus, more excellent image quality in taking static images than the image quality in taking dynamic images can be obtained.

In addition, in the aforementioned embodiment, since the minimum aperture F-number in taking static images is set to be smaller than the minimum aperture F-number in taking dynamic images and the conditional expression (1) is satisfied, it is possible to prevent an excessive amount of light even with a high shutter speed (when the F-number is less than the lower limit) resulting from too low an F-number for a pitch of light receiving pixels, or to prevent reduced image quality (when the F-number is above the upper limit) in taking static images resulting from significantly deteriorated performance due to small aperture diffraction.

Furthermore, in the aforementioned embodiment, when the maximum aperture F-number in taking static images is set to be larger than the maximum aperture F-number in taking dynamic images for the same focal length of the photographic optical system, a compact photographic optical system can be used to realize a camera capable of taking bright dynamic images and high-quality static images with a lighter load on dynamic image processing as described above.

What is claimed is:

1. An optical apparatus, comprising:
 a photographic optical unit having a fixed focal length;
 a light amount adjusting unit disposed in an optical path of said photographic optical unit, said light amount adjusting unit varying an aperture to adjust an amount of light and changing an F-number by varying the aperture;
 an image pickup device for picking up an optical image formed by said photographic optical unit;
 a mode switching member for selecting a dynamic image taking mode and a static image taking mode; and
 a controller for controlling the variation in the aperture by said light amount adjusting unit,
 wherein said controller sets different values of the F-number of said light amount adjusting unit at the fixed focal length of said photographic optical unit in accordance with a state selected by said mode switching member,
 wherein, when said mode switching member selects the static image taking mode, said controller sets an F-number for a minimum aperture of said light amount adjusting unit in the static image taking mode to be smaller than an F-number for a minimum aperture of said light amount adjusting unit in the dynamic image taking mode at the fixed focal length of said photographic optical unit, and
 wherein said image pickup device comprises a plurality of light receiving pixels repeatedly arranged with a predetermined pitch, and a condition below is satisfied:

$$0.2 < Fsmin \times \lambda / P < 4.4$$

where P represents the pitch of said repeatedly arranged light receiving pixels, λ represents a reference wavelength for image taking of a light ray sensed by said image pickup device, and Fsmin represents the F-number for the minimum aperture of said light amount adjusting unit in the static image taking mode.

2. An optical apparatus, comprising:
 a photographic optical unit including a movable optical component for varying a focal length;
 a light amount adjusting unit disposed in an optical path of said photographic optical unit, said light amount adjusting unit varying an aperture to adjust an amount of light and changing an F-number by varying the aperture;
 an image pickup device for picking up an optical image formed by said photographic optical unit;
 a mode switching member for selecting a dynamic image taking mode and a static image taking mode; and
 a controller for controlling the variation in the aperture of said light amount adjusting unit,
 wherein said controller sets different values of the F-number of said light amount adjusting unit at the same focal length of said photographic optical unit in accordance with a state selected by said mode switching member,
 wherein, when said mode switching member selects the static image taking mode, said controller sets an F-number for a minimum aperture of said light amount adjusting unit in the static image taking mode to be smaller than an F-number for a minimum aperture of said light amount adjusting unit in the dynamic image taking mode at the same focal length of said photographic optical unit, and wherein said image pickup device comprises a plurality of light receiving pixels repeatedly arranged with a predetermined pitch, and a condition below is satisfied:

$$0.2 < Fsmin \times \lambda/P < 4.4$$

where P represents the pitch of said repeatedly arranged light receiving pixels, $\lambda$ represents a reference wavelength for image taking of a light ray sensed by said image pickup device, and Fsmin represents the F-number for the minimum aperture of said light amount adjusting unit in the static image taking mode.

* * * * *